United States Patent
Gordon et al.

(10) Patent No.: US 9,751,532 B2
(45) Date of Patent: Sep. 5, 2017

(54) CONTROLLING SPACING OF SELF-DRIVING VEHICLES BASED ON SOCIAL NETWORK RELATIONSHIPS

(71) Applicant: INTERNATIONAL BUSINESS MACHINES CORPORATION, Armonk, NY (US)

(72) Inventors: Michael S. Gordon, Yorktown Heights, NY (US); James R. Kozloski, New Fairfield, CT (US); Ashish Kundu, New York, NY (US); Peter K. Malkin, Ardsley, NY (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 10 days.

(21) Appl. No.: 14/924,163

(22) Filed: Oct. 27, 2015

(65) Prior Publication Data

US 2017/0113687 A1    Apr. 27, 2017

(51) Int. Cl.
*B60W 30/165*    (2012.01)
*B60W 30/17*    (2012.01)
(Continued)

(52) U.S. Cl.
CPC .......... *B60W 30/165* (2013.01); *B60W 30/17* (2013.01); *G01C 21/36* (2013.01);
(Continued)

(58) Field of Classification Search
CPC ..... G01C 21/36; G06F 17/30; G06F 21/6227; H04M 1/725; B60W 30/165; B60W 30/17;
(Continued)

(56) References Cited

U.S. PATENT DOCUMENTS 4,908,988 A    3/1990    Yamamura et al.
5,975,791 A    11/1999    McCulloch
(Continued)

FOREIGN PATENT DOCUMENTS

CN    1135063    11/1996
CN    2349068 Y    11/1999
(Continued)

OTHER PUBLICATIONS

U.S. Appl. No. 14/855,731 Non-Final Office Action Mailed Apr. 15, 2016.
(Continued)

*Primary Examiner* — Behrang Badii
(74) *Attorney, Agent, or Firm* — Law Office of Jim Boice

(57) ABSTRACT

A method and/or computer program product controls a physical spacing between self-driving vehicles (SDVs). One or more processors receive a social network node graph. The social network node graph describes a graphical distance between a first node on the social network node graph and a second node on the social network node graph. The first node represents a first passenger in a first SDV; the second node represents a second passenger in a second SDV; and the graphical distance between the first node and the second node describes a relationship level in a social network between the first passenger and the second passenger. An SDV on-board computer on at least one of the first SDV and the second SDV adjusts a physical spacing between the first SDV and the second SDV proportional to the graphical distance between the first node and the second node.

20 Claims, 9 Drawing Sheets

(51) Int. Cl.
| | |
|---|---|
| G06Q 50/00 | (2012.01) |
| H04L 29/06 | (2006.01) |
| G06F 21/62 | (2013.01) |
| G06Q 50/30 | (2012.01) |
| G06Q 10/10 | (2012.01) |
| H04M 1/725 | (2006.01) |
| G06Q 10/08 | (2012.01) |
| G01C 21/36 | (2006.01) |

(52) U.S. Cl.
CPC ............ *G06F 21/62* (2013.01); *G06Q 10/08* (2013.01); *G06Q 10/1095* (2013.01); *G06Q 50/00* (2013.01); *G06Q 50/30* (2013.01); *H04L 29/06* (2013.01); *H04L 63/10* (2013.01); *H04L 63/20* (2013.01); *H04M 1/725* (2013.01)

(58) Field of Classification Search
CPC ......... H04L 29/06; H04L 63/10; H04L 63/20; G06Q 50/30; G06Q 50/00; G06Q 10/08; G06Q 10/1095; G06Q 50/01; G06Q 10/083
See application file for complete search history.

(56) References Cited

U.S. PATENT DOCUMENTS

| | | |
|---|---|---|
| 6,064,970 A | 5/2000 | McMillian et al. |
| 6,201,318 B1 | 3/2001 | Guillory |
| 6,326,903 B1 | 12/2001 | Gross et al. |
| 6,393,362 B1 | 5/2002 | Burns |
| 6,502,035 B2 | 12/2002 | Levine |
| 6,587,043 B1 | 7/2003 | Kramer |
| 6,622,082 B1 | 9/2003 | Schmidt et al. |
| 6,731,202 B1 | 5/2004 | Klaus |
| 6,810,312 B2 | 10/2004 | Jammu et al. |
| 7,124,088 B2 | 10/2006 | Bauer et al. |
| 7,580,782 B2 | 8/2009 | Breed et al. |
| 7,769,544 B2 | 8/2010 | Blesener et al. |
| 7,877,269 B2 | 1/2011 | Bauer et al. |
| 7,894,951 B2 | 2/2011 | Norris et al. |
| 7,979,173 B2 | 7/2011 | Breed |
| 8,031,062 B2 | 10/2011 | Smith |
| 8,045,455 B1 | 10/2011 | Agronow et al. |
| 8,078,349 B1 | 12/2011 | Prada Gomez et al. |
| 8,090,598 B2 | 1/2012 | Bauer et al. |
| 8,139,109 B2 | 3/2012 | Schmiedel et al. |
| 8,140,358 B1 | 3/2012 | Ling et al. |
| 8,146,703 B2 | 4/2012 | Baumann et al. |
| 8,152,325 B2 | 4/2012 | McDermott |
| 8,190,322 B2 | 5/2012 | Lin et al. |
| 8,346,480 B2 | 1/2013 | Trepagnier et al. |
| 8,352,112 B2 | 1/2013 | Mudalige |
| 8,442,854 B2 | 5/2013 | Lawton et al. |
| 8,466,807 B2 | 6/2013 | Mudalige |
| 8,489,434 B1 | 7/2013 | Otis et al. |
| 8,509,982 B2 | 8/2013 | Montemerlo et al. |
| 8,583,365 B2 | 11/2013 | Jang et al. |
| 8,660,734 B2 | 2/2014 | Zhu et al. |
| 8,676,466 B2 | 3/2014 | Mudalige |
| 8,786,461 B1 | 7/2014 | Daudelin |
| 8,793,046 B2 | 7/2014 | Lombrozo et al. |
| 8,816,857 B2 | 8/2014 | Nordin et al. |
| 8,874,305 B2 | 10/2014 | Dolgov et al. |
| 8,880,270 B1 | 11/2014 | Ferguson et al. |
| 8,903,591 B1 | 12/2014 | Ferguson et al. |
| 8,924,150 B2 | 12/2014 | Tsimhoni et al. |
| 8,948,955 B2 | 2/2015 | Zhu et al. |
| 8,949,016 B1 | 2/2015 | Ferguson et al. |
| 8,954,217 B1 | 2/2015 | Montemerlo et al. |
| 8,954,252 B1 | 2/2015 | Urmson et al. |
| 8,954,261 B2 | 2/2015 | Das et al. |
| 8,958,943 B2 | 2/2015 | Bertosa et al. |
| 8,965,621 B1 | 2/2015 | Urmson et al. |
| 8,970,362 B2 | 3/2015 | Morley et al. |
| 8,983,705 B2 | 3/2015 | Zhu et al. |
| 8,996,224 B1 | 3/2015 | Herbach et al. |
| 9,014,905 B1 | 4/2015 | Kretzschmar et al. |
| 9,020,697 B2 | 4/2015 | Ricci et al. |
| 9,024,787 B2 | 5/2015 | Alshinnawi et al. |
| 9,082,239 B2 | 7/2015 | Ricci |
| 9,123,049 B2 | 9/2015 | Hyde et al. |
| 9,170,327 B2 | 10/2015 | Choe et al. |
| 9,189,897 B1 | 11/2015 | Stenneth |
| 9,194,168 B1 | 11/2015 | Lu et al. |
| 9,216,745 B2 | 12/2015 | Beardsley et al. |
| 9,286,520 B1 | 3/2016 | Lo et al. |
| 9,305,411 B2 | 4/2016 | Ricci |
| 9,317,033 B2 | 4/2016 | Ibanez-guzman et al. |
| 9,390,451 B1 | 7/2016 | Slusar |
| 9,399,472 B2 | 7/2016 | Minoiu-Enache |
| 9,463,805 B2 | 10/2016 | Kirsch et al. |
| 9,483,948 B1 | 11/2016 | Gordon et al. |
| 2002/0026841 A1 | 3/2002 | Svendsen |
| 2003/0065572 A1 | 4/2003 | McNee et al. |
| 2003/0076981 A1 | 4/2003 | Smith et al. |
| 2004/0078133 A1 | 4/2004 | Miller |
| 2004/0199306 A1 | 10/2004 | Heilmann et al. |
| 2005/0104745 A1 | 5/2005 | Bachelder et al. |
| 2006/0106671 A1 | 5/2006 | Biet |
| 2006/0163939 A1 | 7/2006 | Yuramochi et al. |
| 2006/0200379 A1 | 9/2006 | Biet |
| 2006/0241855 A1 | 10/2006 | Joe et al. |
| 2007/0100687 A1 | 5/2007 | Yoshikawa |
| 2007/0124027 A1 | 5/2007 | Betzitza et al. |
| 2008/0048850 A1 | 2/2008 | Yamada |
| 2008/0114663 A1 | 5/2008 | Watkins et al. |
| 2008/0129475 A1 | 6/2008 | Breed et al. |
| 2008/0201217 A1 | 8/2008 | Bader et al. |
| 2009/0094109 A1 | 4/2009 | Aaronson et al. |
| 2009/0248231 A1 | 10/2009 | Kamiya |
| 2009/0313096 A1 | 12/2009 | Kaga |
| 2010/0057511 A1 | 3/2010 | Mansouri et al. |
| 2010/0156672 A1 | 6/2010 | Yoo et al. |
| 2010/0179720 A1 | 7/2010 | Lin et al. |
| 2010/0228427 A1 | 9/2010 | Anderson et al. |
| 2010/0256852 A1 | 10/2010 | Mudalige |
| 2011/0035250 A1 | 2/2011 | Finucan |
| 2011/0077807 A1 | 3/2011 | Hyde et al. |
| 2011/0137699 A1 | 6/2011 | Ben-Ari et al. |
| 2011/0264521 A1 | 10/2011 | Straka |
| 2012/0277947 A1 | 11/2012 | Boehringer et al. |
| 2013/0030657 A1 | 1/2013 | Chatterjee et al. |
| 2013/0113634 A1 | 5/2013 | Hutchinson et al. |
| 2013/0131949 A1 | 5/2013 | Shida |
| 2013/0144502 A1 | 6/2013 | Shida |
| 2013/0231824 A1 | 9/2013 | Wilson et al. |
| 2013/0261871 A1 | 10/2013 | Hobbs et al. |
| 2014/0019259 A1 | 1/2014 | Dung et al. |
| 2014/0092332 A1 | 4/2014 | Price |
| 2014/0095214 A1 | 4/2014 | Mathe et al. |
| 2014/0129073 A1 | 5/2014 | Ferguson |
| 2014/0136045 A1 | 5/2014 | Zhu et al. |
| 2014/0136414 A1 | 5/2014 | Abhyanker |
| 2014/0164126 A1 | 6/2014 | Nicholas et al. |
| 2014/0188999 A1 | 7/2014 | Leonard et al. |
| 2014/0195213 A1 | 7/2014 | Kozloski et al. |
| 2014/0201037 A1 | 7/2014 | Mallawarachchi et al. |
| 2014/0201126 A1* | 7/2014 | Zadeh .................... G06K 9/627 706/52 |
| 2014/0214255 A1 | 7/2014 | Dolgov et al. |
| 2014/0222277 A1 | 8/2014 | Tsimhoni et al. |
| 2014/0222577 A1 | 8/2014 | Abhyanker |
| 2014/0282967 A1* | 9/2014 | Maguire ............... H04W 36/18 726/7 |
| 2014/0297116 A1 | 10/2014 | Anderson et al. |
| 2014/0306833 A1 | 10/2014 | Ricci |
| 2014/0309789 A1 | 10/2014 | Ricci |
| 2014/0309806 A1 | 10/2014 | Ricci |
| 2014/0309864 A1 | 10/2014 | Ricci |
| 2014/0309891 A1 | 10/2014 | Ricci |
| 2014/0310186 A1 | 10/2014 | Ricci |
| 2014/0316671 A1 | 10/2014 | Okamoto |
| 2014/0324268 A1 | 10/2014 | Montemerlo et al. |

(56) References Cited

U.S. PATENT DOCUMENTS

| | | | |
|---|---|---|---|
| 2014/0330479 | A1 | 11/2014 | Dolgov |
| 2014/0358331 | A1 | 12/2014 | Prada Gomez et al. |
| 2014/0358353 | A1 | 12/2014 | Ibanez-Guzman et al. |
| 2015/0006005 | A1 | 1/2015 | Yu et al. |
| 2015/0006014 | A1 | 1/2015 | Wimmer et al. |
| 2015/0026092 | A1 | 1/2015 | Abboud et al. |
| 2015/0035685 | A1 | 2/2015 | Strickland et al. |
| 2015/0051778 | A1 | 2/2015 | Mueller |
| 2015/0057891 | A1 | 2/2015 | Mudalige et al. |
| 2015/0062340 | A1 | 3/2015 | Datta et al. |
| 2015/0062469 | A1 | 3/2015 | Fleury |
| 2015/0066282 | A1 | 3/2015 | Yopp |
| 2015/0066284 | A1 | 3/2015 | Yopp |
| 2015/0070178 | A1 | 3/2015 | Kline |
| 2015/0095190 | A1 | 4/2015 | Hammad et al. |
| 2015/0134178 | A1 | 5/2015 | Minoiu-Enache |
| 2015/0141043 | A1* | 5/2015 | Abramson ............ G01C 21/34 455/456.1 |
| 2015/0149021 | A1 | 5/2015 | Duncan et al. |
| 2015/0160019 | A1 | 6/2015 | Biswal et al. |
| 2015/0166059 | A1 | 6/2015 | Ko |
| 2015/0175070 | A1 | 6/2015 | Attard et al. |
| 2015/0178998 | A1 | 6/2015 | Attard et al. |
| 2015/0196256 | A1 | 7/2015 | Venkatraman et al. |
| 2015/0232065 | A1 | 8/2015 | Ricci et al. |
| 2015/0293994 | A1* | 10/2015 | Kelly .................. H04L 41/12 707/740 |
| 2015/0338226 | A1 | 11/2015 | Mason et al. |
| 2015/0339639 | A1 | 11/2015 | Choe |
| 2016/0001781 | A1 | 1/2016 | Fung et al. |
| 2016/0026182 | A1 | 1/2016 | Boroditsky et al. |
| 2016/0075512 | A1 | 3/2016 | Lert, Jr. |
| 2016/0078695 | A1 | 3/2016 | McClintic et al. |
| 2016/0078758 | A1 | 3/2016 | Basalamah |
| 2016/0139594 | A1 | 5/2016 | Okumura et al. |
| 2016/0140507 | A1 | 5/2016 | Stevens et al. |
| 2016/0176409 | A1 | 6/2016 | Kirsch et al. |
| 2016/0303969 | A1 | 10/2016 | Akula |
| 2016/0334797 | A1 | 11/2016 | Ross et al. |
| 2016/0344737 | A1* | 11/2016 | Anton ................. G06F 21/6227 |
| 2016/0355192 | A1 | 12/2016 | James et al. |
| 2016/0364823 | A1* | 12/2016 | Cao .................... G06Q 10/1095 |

FOREIGN PATENT DOCUMENTS

| | | |
|---|---|---|
| CN | 201004265 Y | 1/2008 |
| CN | 202012052 | 10/2011 |
| CN | 202038228 U | 11/2011 |
| CN | 102650882 | 8/2012 |
| CN | 202772924 | 3/2013 |
| CN | 104900018 A | 9/2015 |
| EP | 0582236 A1 | 2/1994 |
| WO | 2014058263 A1 | 4/2014 |
| WO | 2014066721 A2 | 5/2014 |
| WO | 2014147361 A1 | 9/2014 |
| WO | 2014148975 A1 | 9/2014 |
| WO | 2014148976 A1 | 9/2014 |
| WO | 2015024616 A1 | 2/2015 |
| WO | 2015056105 A1 | 4/2015 |
| WO | 2015156146 A1 | 10/2015 |

OTHER PUBLICATIONS

Brownell, "Shared Autonomous Taxi Networks: An Analysis of Transportation Demand in NJ and a 21st Century Solution for Congestion", Dissertation, Princeton University, 2013, pp. 1-122.

Sessa et al., "Blueprint of Alternative City Cyber-Mobility Take-U Scenarios", Seventh Framework Programme Theme SST.2012.3.1-4, Automated Urban Vehicles Collaborative Project—Grant Agreement No. 314190, 2013, pp. 1-63.

Lutin et al., "The Revolutionary Development of Self-Driving Vehicles and Implications for the Transportation Engineering Profession", ITE Journal 83.7, 2013, pp. 28-32.

A. Hars, "Self-Driving Cars: The Digital Transformation of Mobility", Marktplatze im Umbruch, Springer Berlin Heidelberg, 2015, pp. 539-549.

Jimenez et al.; "Autonomous collision avoidance system based on accurate knowledge of the vehicle surroundings"; Inst Engineering Technology—IET; IET Intelligent Transport Systems vol. 9, No. 1, pp. 105-117; 2015; England.

Anonymous, "Avoiding Crashes With Self-Driving Cars: Today's Crash-Avoidance Systems Are the Mile Markers to Tomorrow's Autonomous Vehicles". Consumer Reports Magazine, Feb. 2014. Web. Sep. 22, 2016. <http://www.consumerreports.org/cro/magazine/2014/04/the-road-to-self-driving-cars/index.htm>.

Anonymous, "Google Files Patent for Second-Gen Autonomous Vehicle Without a Steering Wheel, Brake Pedal & More". patentlymobile.com, Nov. 27, 2015. Web. Sep. 22, 2016. <http://www.patentlymobile.com/2015/11/GOOGLE-FILES-PATENT-FOR-SECOND-GEN-AUTONOMOUS-VEHICLE-WITHOUT-A-STEERING-WHEEL-BRAKE-PEDAL-MORE.HTML>.

C. Berger et al., "COTS—Architecture With a Real-Time OS for a Self-Driving Miniature Vehicle", SAFECOMP 2013—Workshop ASCOMS of the 32nd International Conference on Computer Safety, Reliability and Security, Sep. 2013, Toulouse, France, pp. 1-13.

P. Mell et al., "The NIST Definition of Cloud Computing", National Institute of Standards and Technology, Information Technology Laboratory, Sep. 2011, pp. 1-7.

X. Jardin, "Terrifying dashcam video captures distracted teen drivers crashing while goofing off", Boing Boing, www.boingboing.net, Mar. 26, 2015, 1 page.

M. Fox, "Self-driving cars safer than those driven by humans: Bob Lutz", CNBC, www.cnbc.com, Sep. 8, 2014, 1 page.

U.S. Appl. No. 14/887,388, filed Oct. 20, 2015.

A. Abkowitz, "Do Self-Driving Cars Spell Doom for Auto Insurers?", Bloomberg L.P., Sep. 10, 2014, pp. 1-2.

Anonymous, "Self-Driving Cars and Insurance", Insurance Information Institute, Inc., Feb. 2015, pp. 1-3.

Gomes, Lee. "Google's Self-Driving Cars Still Face Many Obstacles / MIT Technology Review", MIT Technology Review. Aug. 28, 2014. Web. <http://www.technologyreview.co,/news/530276/hidden-obstabscles-for-googles-self-driving-cars/>.

Smith, Mark. "Inovations: Emerging Trends in the Wheelchair Market." New Mobility Magazine, Aug. 1, 2014. Web. <http://www.newmobility.com/2014/08/emerging-trends/>.

Crothers, Brooke. "Google Now Reporting Self-Driving Car Accidents: Her, It's Not the Car's Fault". forbes.com, Jun. 8, 2015. <http://www.forbes.com/sites/brookecrothers/2015/06/08/google-now-reportibg-driverless-car-accidents/>.

Anonymous, 'System and Method to Target Advertisements for the Right Focus Group'. ip.com, No. 000218285, May 31, 2012, pp. 1-2.

Anonymous, "Car Built-In Mechanism to Enforce Mandatory Self-Driving Mode", ip.com, No. 300234916, Feb. 14, 2014, pp. 1-3.

T. Horberry et al., "Driver Distraction: The Effects of Concurrent In-Vehicle Tasks, Road Enviornment Complexity and Age on Driving Performance", Elsevier Ltd., Accident Analysis and Prevention, 38, 2006, pp. 185-191.

J. Miller, "Self-Driving Car Technologu's Benefits, Potential Risks, and Solutions", The Energy Collective, theenergycollective.com, Aug. 19, 2014, pp. 1-7.

J. O'Callaghan, "Inside the Mercedes Self-Guidubg Car That's Built for Luxurious Living In, Not Driving", Associated Newspapers Ltd., Daily Mail, dailymail.com.uk, Jan. 6, 2015, pp. 1-13.

J. Wei et al., "Towards a Viable Autonomous Driving Research Platform", IEEE, Intelegent Vehicles Symposium (IV), 2013, pp. 1-8.

J. Farrier, "Airlines Infuse Their Planes With Smells to Calm You Down", Neatorama, neatorama.com, Mar. 29, 2015, 1 page.

T. Vanderbilt, "Let the Robot Drive: The Autonomous Car of the Future is Here", Wired Magazine, Conde Nast, www.wired.com, Jan. 20, 2012. pp. 1-34.

Chen S, et al., A Crash Risk Assessment Model for Roas Curves. Inproceedings 20th International Technical Conference on the Enhanced Saftey of Vehicles., 2007. Lyon, France.

(56) References Cited

OTHER PUBLICATIONS

E. Lehrer, "The Insurance Implications of Google's Self-Driving Car", Insurance Journal, Right Street Bloh=G, May 28, 2014, pp. 1-2.

Anonymous, "Diagnostics Mechanism for Self-Driving Cars to Validate Self-Driving Capabilities", ip.com, Jun. 6, 2014, pp. 1-5. ip.com.

\* cited by examiner

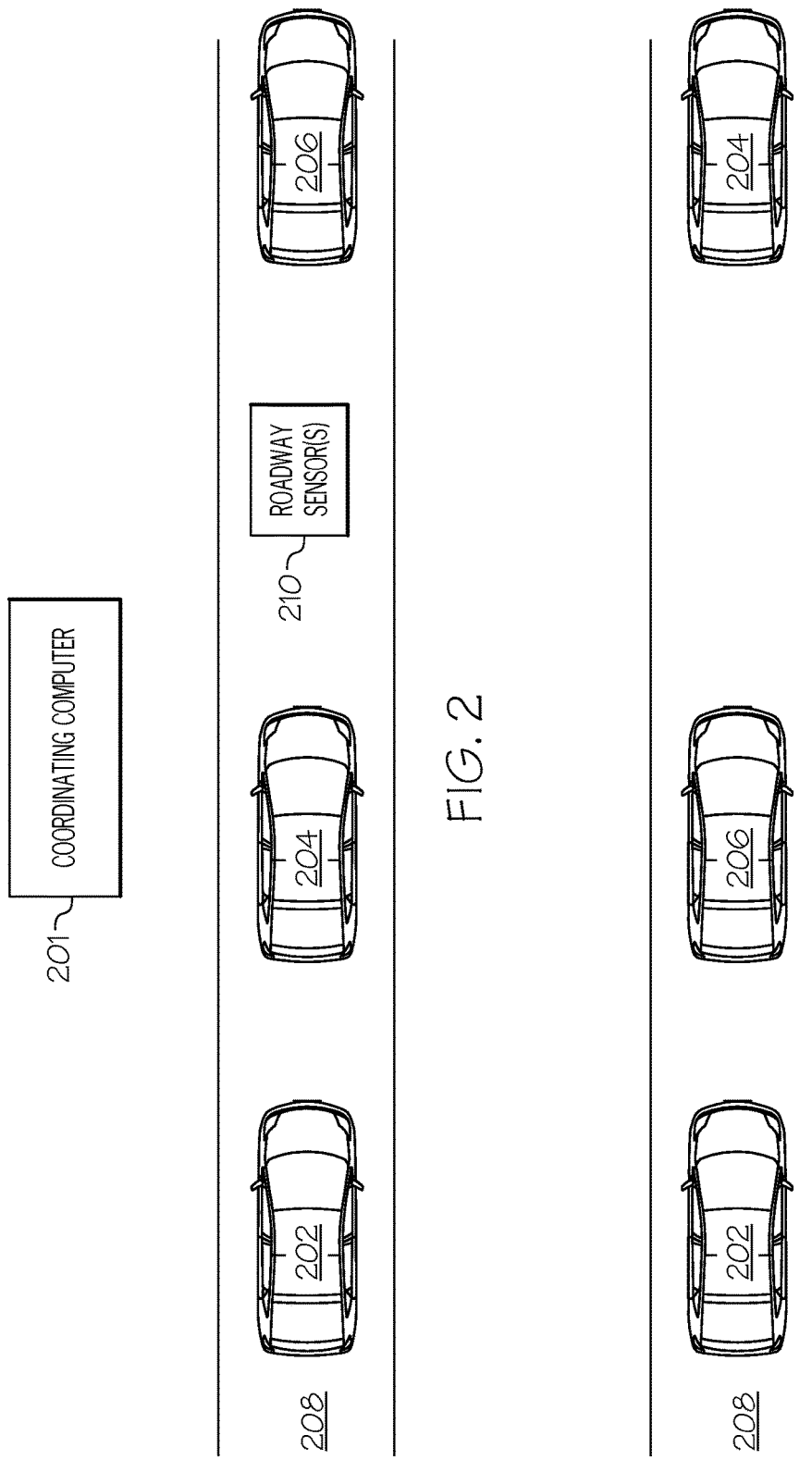

CONTROLLING SPACING OF SELF-DRIVING VEHICLES BASED ON SOCIAL NETWORK RELATIONSHIPS

BACKGROUND

The present disclosure relates to the field of vehicles, and specifically to the field of self-driving vehicles. Still more specifically, the present disclosure relates to the field of controlling spacing between self-driving vehicles based on social network relationships between passengers in the self-driving vehicles.

Self-driving vehicles (SDVs) are vehicles that are able to autonomously drive themselves through private and/or public spaces. Using a system of sensors that detect the location and/or surroundings of the SDV, logic within or associated with the SDV controls the speed, propulsion, braking, and steering of the SDV based on the sensor-detected location and surroundings of the SDV.

SUMMARY

In one or more embodiments of the present invention, a method and or computer program product control a physical spacing between self-driving vehicles (SDVs). One or more processors receive a social network node graph. The social network node graph describes a graphical distance between a first node on the social network node graph and a second node on the social network node graph. The first node represents a first passenger in a first SDV; the second node represents a second passenger in a second SDV; and the graphical distance between the first node and the second node describes a relationship level in a social network between the first passenger and the second passenger. An SDV on-board computer on at least one of the first SDV and the second SDV adjusts a physical spacing between the first SDV and the second SDV proportional to the graphical distance between the first node and the second node.

In an embodiment of the present invention, a self-driving vehicle includes a processor, a computer readable memory, and a non-transitory computer readable storage medium. Stored on the non-transitory computer readable storage medium are first and second program instructions. The first program instructions are designed to receive a social network node graph, which describes a graphical distance between a first node on the social network node graph and a second node on the social network node graph. The self-driving vehicle is a first self-driving vehicle (SDV), such that the first node represents a first passenger in a first SDV; the second node represents a second passenger in a second SDV; and the graphical distance between the first node and the second node describes a relationship level in a social network between the first passenger and the second passenger. The second program instructions are designed to direct an SDV on-board computer on the first SDV to adjust a physical spacing between the first SDV and the second SDV proportional to the graphical distance between the first node and the second node. Thus, the first and second program instructions are stored on the non-transitory computer readable storage medium for execution by one or more processors via the computer readable memory.

BRIEF DESCRIPTION OF THE DRAWINGS

FIG. 2 illustrates exemplary SDVs traveling on a roadway;

FIG. 3 illustrates the SDVs shown in FIG. 2 after being spatially repositioned according to social network relationships of passengers in the SDVs in accordance with one or more embodiments of the present invention;

DETAILED DESCRIPTION

Figure 1:
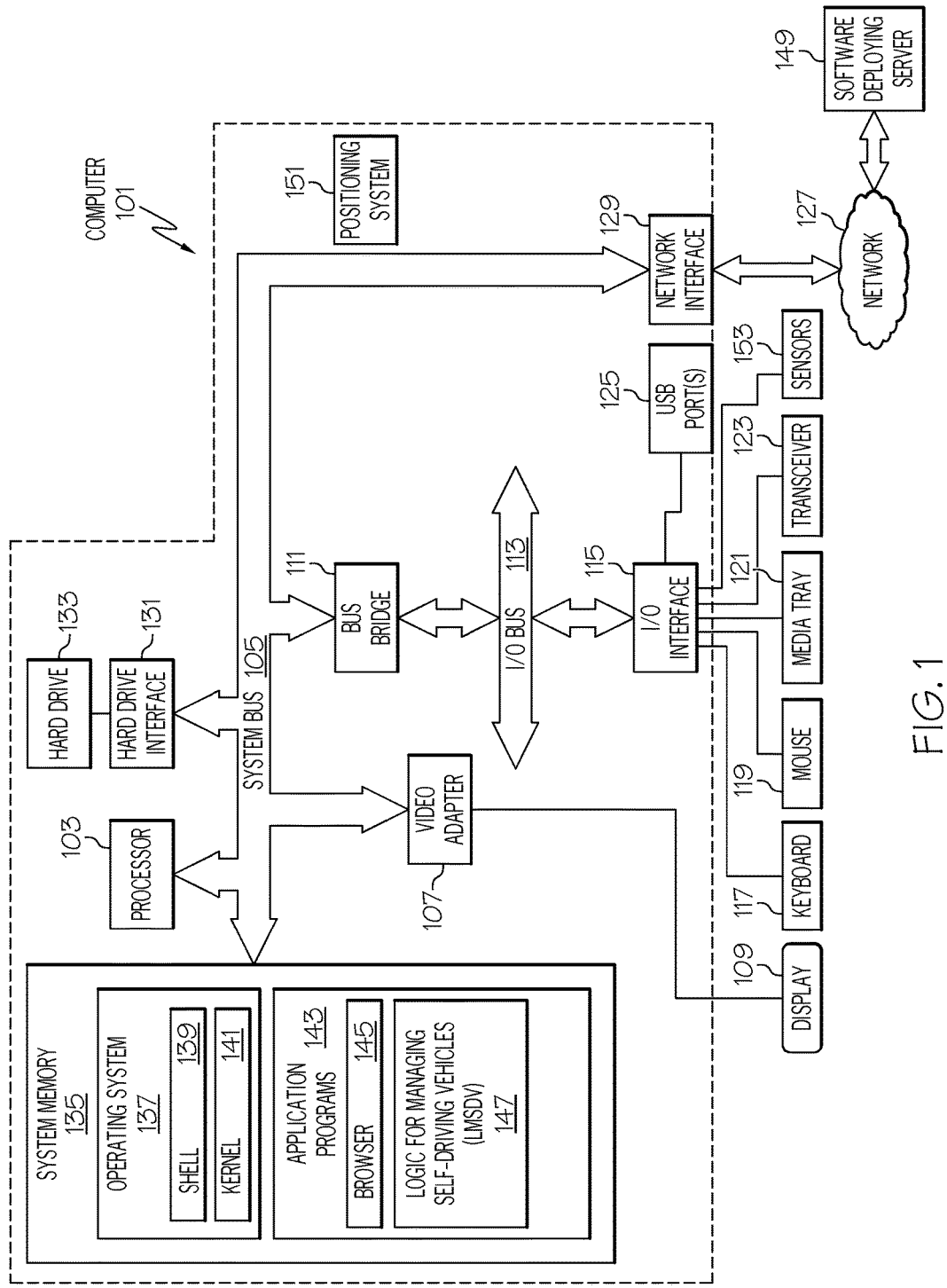
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 shown in FIG. 1, and/or coordinating computer 201 shown in FIG. 2, and/or a self-driving vehicle (SDV) on-board computer 501 shown in FIG. 5, and/or a coordinating server 601 depicted in FIG. 6.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), a transceiver 123 (capable of transmitting and/or receiving electronic communication signals), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems (e.g., establishing communication among SDV 202, SDV 204, SDV 206, and/or coordinating server 601 depicted in the figures below) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Logic for Managing Self-Driving Vehicles (LMSDV) 147. LMSDV 147 includes code for implementing the processes described below, including those described in FIGS. 2-7. In one embodiment, computer 101 is able to download LMSDV 147 from software deploying server 149, including in an on-demand basis, wherein the code in LMSDV 147 is not downloaded until needed for execution. In one embodiment of the present invention, software deploying server 149 performs all of the functions associated with the present invention (including execution of LMSDV 147), thus freeing computer 101 from having to use its own internal computing resources to execute LMSDV 147.

Also within computer 101 is a positioning system 151, which determines a real-time current location of computer 101 (particularly when part of an emergency vehicle and/or a self-driving vehicle as described herein). Positioning system 151 may be a combination of accelerometers, speedometers, etc., or it may be a global positioning system (GPS) that utilizes space-based satellites to provide triangulated signals used to determine two-dimensional or three-dimensional locations.

Also associated with computer 101 are sensors 153, which detect an environment of the computer 101. More specifically, sensors 153 are able to detect vehicles, road obstructions, pavement, etc. For example, if computer 101 is on board a self-driving vehicle (SDV), then sensors 153 may be cameras, radar transceivers, etc. that allow the SDV to detect the environment (e.g., other vehicles, road obstructions, pavement, etc.) of that SDV, thus enabling it to be autonomously self-driven. Similarly, sensors 153 may be cameras, thermometers, moisture detectors, etc. that detect ambient weather conditions and other environmental conditions of a roadway upon which the SDV is traveling.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

With reference now to FIG. 2, an exemplary self-driving vehicle (SDV) 202, SDV 204, and SDV 206 are depicted traveling along a roadway 208 in accordance with one or more embodiments of the present invention. Roadway 208 may be a public roadway, a private roadway, a parking lot, a paved road, an unpaved road, and/or any other surface capable of supporting vehicles, which may be wheeled (e.g., cars), tracked (e.g., trains), or a combination thereof.

As depicted in FIG. 2, initially SDV 202 is traveling close to SDV 204, but distant from SDV 206. However, as described herein, occupants/passengers of the different SDVs (i.e., any passenger of the SDVs, including the nominal driver, non-driving passengers, pets, etc.) may be related according to a social network node graph.

Figure 4:
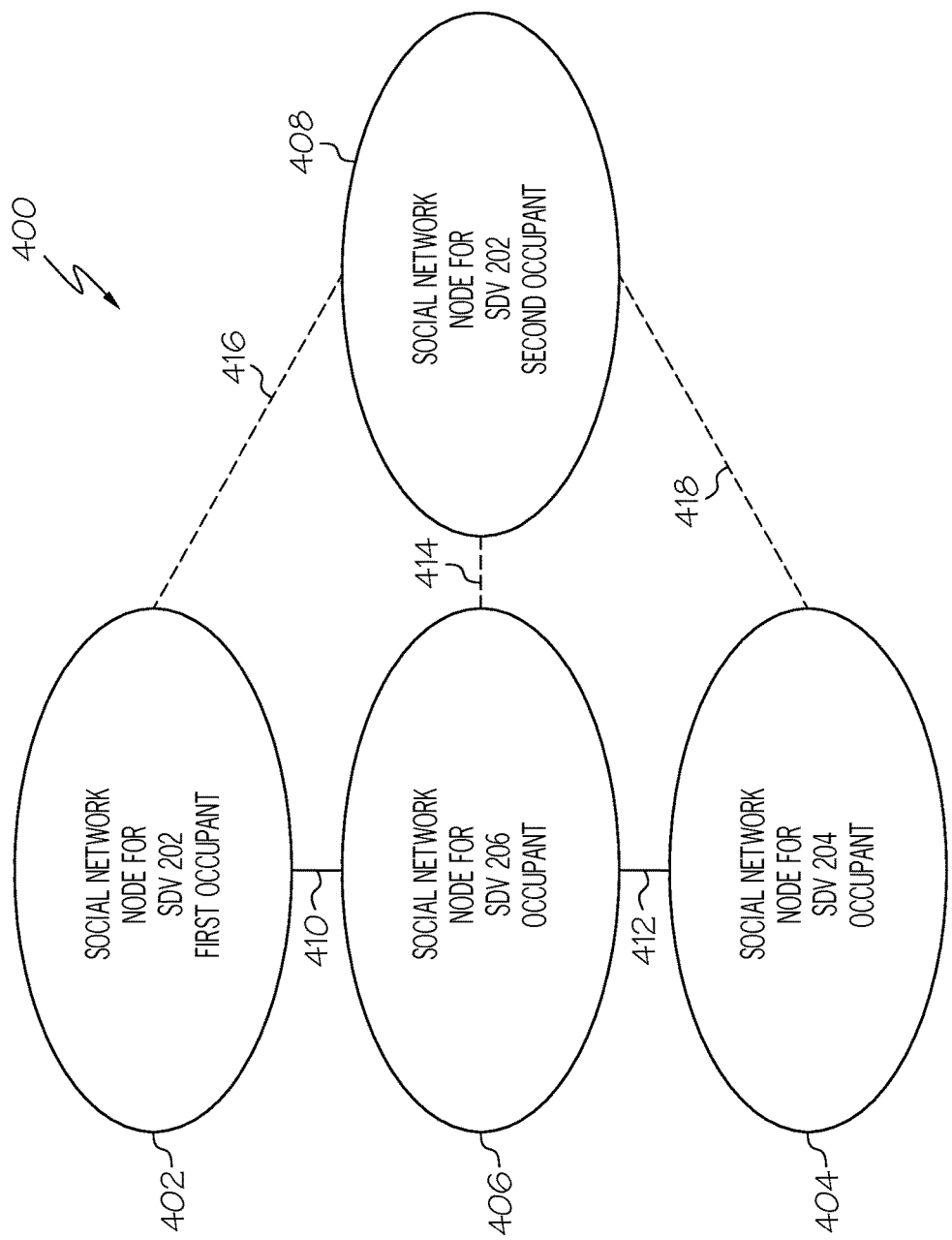
FIG. 4 illustrates an exemplary social network node graph of passengers of one or more self-driving vehicles (SDVs)

For example, consider FIG. 4, which shows a social network node graph 400 for passengers in the SDVs 202/204/206 shown in FIG. 2. A social network is defined as a social structure made up of entities, whose relationships are identified according to relationship levels, which are defined by dyadic ties. For example, in social network node graph 400, social network nodes 402/404/406/408 depict various relationship levels in a social network of passengers of the SDVs 202/204/206 shown in FIG. 2.

For example and as shown in FIG. 4, social network node 402 for a first passenger of the SDV 202 shown in FIG. 2 is directly connected to the social network node 406 for any passenger of the SDV 206 shown in FIG. 2 by dyadic tie 410, indicating that these two entities have a "first order" relationship level. That is, there is only one "hop" (connection distance) from social network node 402 to social network node 406. This single hop relationship level is due to the first passenger of SDV 202 being in a first level circle of friends with the passenger of SDV 206. In accordance with various embodiments of the present invention, this first level circle of friends is the result of 1) the first passenger of the SDV 202 and the (i.e., any) passenger of the SDV 206 having directly agreed to be "friends" in the social network; 2) the first passenger of the SDV 202 and the (i.e., any) passenger of the SDV 206 being in a same social network group, such as a common group of persons working on a same project, fans of a same team, residents of a same city, etc.; 3) the first passenger of the SDV 202 and the (i.e., any) passenger of the SDV 206 both being members of a same dating service; 4) the first passenger of the SDV 202 and the (i.e., any) passenger of the SDV 206 both being members of an emergency relief team (e.g., volunteer firefighters); 5) the first passenger of the SDV 202 and the (i.e., any) passenger of the SDV 206 both being members of a same family; and/or 6) any other dyadic (i.e., one-to-one) relationship defined by the social network that relates the first passenger of the SDV 202 and the (i.e., any) passenger of the SDV 206 to one another.

As shown in FIG. 4, the social network node 402 for the first passenger of the SDV 202 is not directly tied to the social network node 404 for the (i.e., any) passenger of the SDV 204 shown in FIG. 2. Rather, social network node 406 is directly connected to social network node 404 by dyadic tie 412, thus giving the passenger of the SDV 206 and the (i.e., any) passenger of the SDV 204 a relationship level that is "first order". This leads to the first passenger of the SDV 202 having a "second order" relationship with the (i.e., any) passenger of the SDV 204, as indicated by the two "hops" (e.g., based on dyadic tie 410 and dyadic tie 412) between social network node 402 and social network node 404.

For example, the first passenger of the SDV 202 may be a member of a first group of persons in the social network as is the passenger of SDV 206. Similarly, the passenger of the SDV 206 may be a member of a second group of persons in the social network as is the passenger of the SDV 204. However, the first passenger of the SDV 202 is not a member of the second group, and therefore has a "second order" relationship with the passenger of the SDV 204. For example, these two persons (riding in SDV 202 and 204) may have a mutual friend (the passenger of SDV 206), but are not directly friends with one another. The present invention utilizes these social network node graphical ties to determine how closely SDVs are positioned to one another.

As described herein, the social network relationships between passenger(s) in SDV 202 and passenger(s) in SDV 204 are used to determine how physically close SDV 202 and SDV 204 are to one another. Thus, in one or more embodiments these relationships are not one-to-one (i.e., between one passenger in SDV 202 and one passenger in SDV 204), but are based on multiple passengers in SDV 202 and/or SDV 204.

In one embodiment, the social relationships between multiple passengers are additive. That is, the number of "hops" between nodes in a social network graph (described herein) for all of the passengers are merely added together in order to determine the physical spacing between SDV 202 and SDV 204. In another embodiment, however the social relationships are weighted. For example, if the driver of SDV 202 and the driver of SDV 204 are the only two persons of interest, then the number of "hops" between nodes in the social network graph for other passengers in SDVs 202/204 are irrelevant, and only the number of "hops" between nodes in the social network graph for the drivers of SDVs 202/204 are considered. Alternatively, the weighting may be proportional, such that the number of "hops" on the social network for certain pairs of passengers from SDVs 202/204 are weighted more heavily than other pairs of passengers from SDVs 202/204, such that the more heavily weighted pairs of passengers from SDVs 202/204 have a greater impact on the physical spacing between SDVs 202/204.

Returning now to FIG. 2, as described in FIG. 4 the first passenger of SDV 202 is closely aligned in a social network with the passenger of SDV 206, but is less closely aligned with the passenger of the SDV 204. The present invention utilizes this social network relational alignment to determine how closely together SDVs 202/204/206 are positioned relative to one another. That is, there is a proportional relationship between how far apart nodes on a social network node graph are and the physical spacing distance between SDVs.

Thus, as shown in FIG. 4, since the social network node 402 is graphically/logically close to the social network node 406 (i.e., there is only a single dyadic tie 410 between these two nodes), then SDV 202 and SDV 206 are repositioned in FIG. 3 to be physically close to one another. Furthermore, since the social network node 402 in FIG. 4 is distant from the social network node 404 (i.e., there are two "hops" between these nodes as depicted by dyadic tie 410 and dyadic tie 412), then SDV 202 and SDV 204 are reposi-tioned in FIG. 3 to be physically spaced farther in FIG. 3 as compared to FIG. 2. In one or more embodiments of the preset invention, this repositioning is performed autonomously by the SDV(s) utilizing the SDV on-board computer 501 and/or SDV control processor 503 depicted in FIG. 5.

In one or more embodiments of the present invention, the physical spacing between SDVs and the logical/graphical distance between social network node graph nodes is linear. For example, each "hop" between social network node graph nodes (i.e., each dyadic tie) may map to a certain physical distance between SDVs (e.g., 0.1 kilometer). In this example, the present invention would maintain the physical distance between SDV 202 and SDV 206 at 0.1 kilometer, the physical distance between SDV 206 and SDV 204 at 0.1 kilometer, and the physical distance between SDV 202 and SDV 204 at 2.0 kilometers. This allows passengers in SDV 202 to be able to see passengers in SDV 206 and passengers in SDV 202 to be able to see passengers in SDV 204, and to arrive at their destination as essentially the same time.

Alternatively, the physical spacing/hop relationship may be on a sliding scale. For example, if there is only one hop between a first social network node (e.g., social network node 402 shown in FIG. 4) and a second social network node (e.g., social network node 406), then the physical separation between corresponding SDV 402 and SDV 406 may be 100 meters. However, if there are two hops between a first social network node (e.g., social network node 402 shown in FIG. 4) and a second social network node (e.g., social network node 404), then the physical separation between corresponding SDV 402 and SDV 404 may be 1 kilometer. In one or more embodiments of the present invention, the physical separation is controlled by the SDV on-board computer 501 shown in FIG. 5, either autonomously or under the direction of the coordinating server 601 shown in FIG. 6.

Thus, the present invention does not physically "cluster" SDVs based just on passengers of SDVs being in a same social network, but rather establishes the physical distance between SDVs based on the relationship level in the social network (e.g., one hop first order, two hop second order, etc.) of the passengers of the different SDVs.

The physical spacing between SDVs may be further adjusted based on current conditions of the roadway 208, including weather conditions, traffic conditions, construction events, accident events, etc., can be determined and transmitted by a coordinating computer 201. That is, coordinating computer 201 is able to determine current roadway conditions based on internal sensors 153 shown in FIG. 1, and/or roadway sensor(s) 210 (e.g., mechanical, visual, and/or electrical sensors that are able to detect the number and speed of vehicles traveling on the roadway 208, the amount and/or type of precipitation on the roadway 208, the temperature of the roadway 208 and/or ambient air around the roadway 208, the movement of vehicles traveling along roadway 208, etc.), as well as information received from sensors and/or on-board computers within SDVs 202/204/206, and/or from information received by an information service (e.g., a weather station). In one or more embodiments, these roadway conditions are utilized in establishing spacing distances and/or operational/driving modes of one or more of the SDVs 202/204/206.

In accordance with various embodiments of the present invention, at least one of the SDVs 202/204/206 operates in autonomous mode, such that spacing distances are automatically adjusted by on-board hardware, even if one or more of the SDVs 202/204/206 are being driven in manual mode. The terms "manual mode" or "autonomous mode" are referred to as either an operational mode or a driving mode, such that the terms "operational mode" and "driving mode" are synonymous and interchangeable.

As used and described herein, "manual mode" is defined as an SDV being at least partially under the input control of a human driver. That is, if exemplary SDV 202 is being steered by a human driver but has cruise control activated, then it is in manual mode, since SDV 202 is partially under the input control (steering) of the human driver. Thus, while in manual mode, SDV 202 operates as a traditional motor vehicle, in which a human driver controls the engine throttle, engine on/off switch, steering mechanism, braking system, horn, signals, etc. found on a motor vehicle. These vehicle mechanisms may be operated in a "drive-by-wire" manner, in which inputs to an SDV control processor 503 (shown in FIG. 5) by the driver result in output signals that control the SDV vehicular physical control mechanisms 505 (e.g., the engine throttle, steering mechanisms, braking systems, turn signals, etc.).

Figure 5:
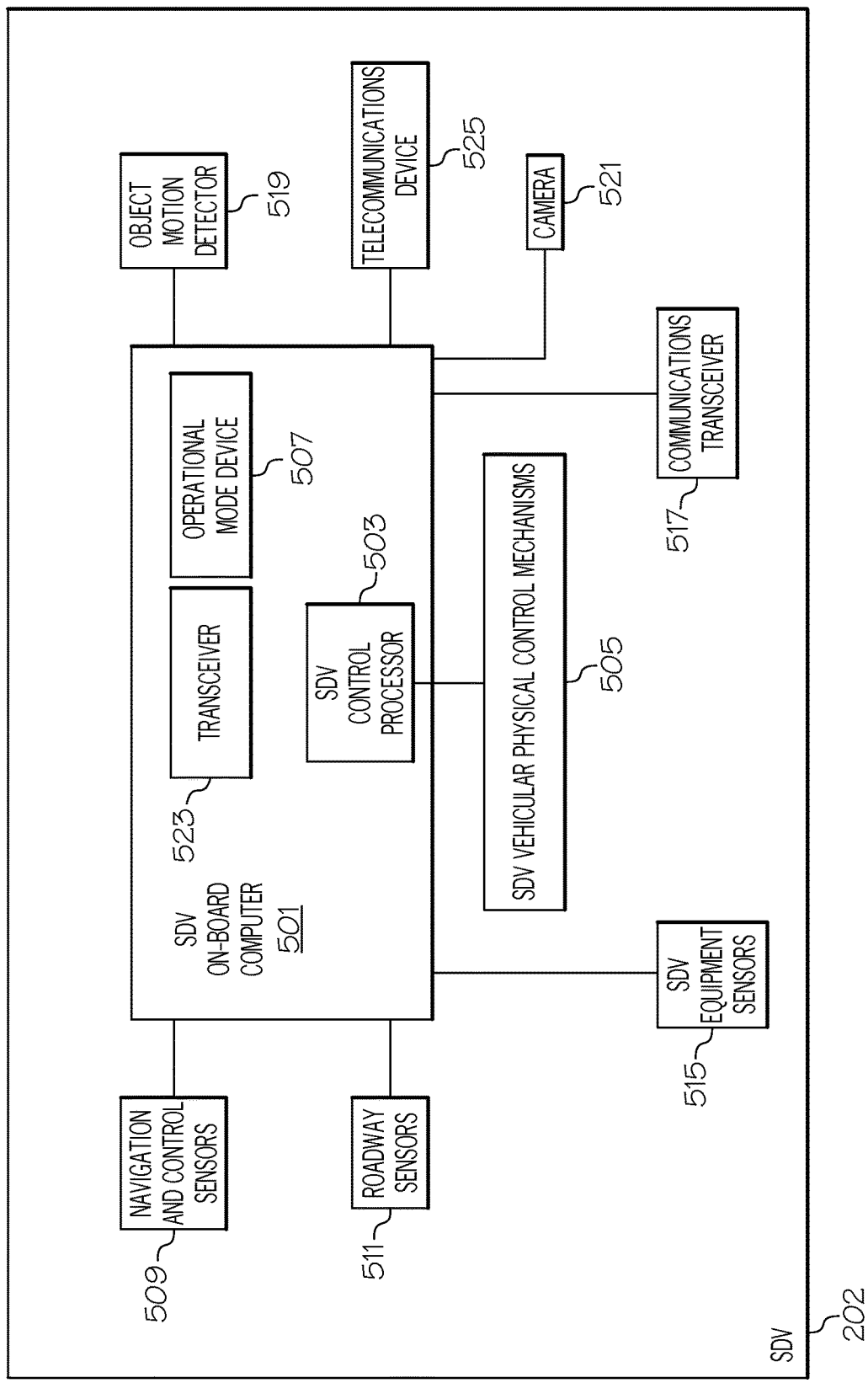
FIG. 5 depicts additional detail of control hardware within an SDV.

As used and described herein, "autonomous mode" is defined as an SDV being totally controlled by hardware/software logic (e.g., SDV on-board computer 501 and/or operational mode device 507 and/or SDV control processor 503 shown in FIG. 5) without inputs from the human driver. That is, if steering, braking, throttle control, obstacle/vehicle avoidance, etc. are all under the control of hardware/software logic such as the SDV on-board computer 501 shown in FIG. 5, then SDV 202 is in an autonomous mode.

Additional details of one or more embodiments of the SDV 202 (which may have a same architecture as SDV 204 and/or SDV 206) are presented in FIG. 5. As shown in FIG. 5, SDV 202 has an SDV on-board computer 501 that controls operations of the SDV 202. According to directives from a operational mode device 507, the SDV 202 can be selectively operated in manual mode or autonomous mode (including the nominal autonomous mode, evasive autonomous mode, and/or stopping autonomous mode described above). In a preferred embodiment, operational mode device 507 is a dedicated hardware device that selectively directs the SDV on-board computer 501 to operate the SDV 202 in one of the autonomous modes or in the manual mode.

While in autonomous mode, SDV 202 operates without the input of a human driver, such that the engine, steering mechanism, braking system, horn, signals, etc. are controlled by the SDV control processor 503, which is now under the control of the SDV on-board computer 501. That is, by the SDV on-board computer 501 processing inputs taken from navigation and control sensors 509 and the operational mode device 507 (indicating that the SDV 202 is to be controlled autonomously), then driver inputs to the SDV control processor 503 and/or SDV vehicular physical control mechanisms 505 are no longer needed.

As just mentioned, the SDV on-board computer 501 uses outputs from navigation and control sensors 509 to control the SDV 202. Navigation and control sensors 509 include hardware sensors that 1) determine the location of the SDV 202; 2) sense other cars and/or obstacles and/or physical structures around SDV 202; 3) measure the speed and direction of the SDV 202; and 4) provide any other inputs needed to safely control the movement of the SDV 202.

With respect to the feature of 1) determining the location of the SDV 202, this can be achieved through the use of a positioning system such as positioning system 151 shown in FIG. 1. Positioning system 151 may use a global positioning system (GPS), which uses space-based satellites that provide positioning signals that are triangulated by a GPS receiver to determine a 3-D geophysical position of the SDV 202. Positioning system 151 may also use, either alone or in conjunction with a GPS system, physical movement sensors such as accelerometers (which measure rates of changes to a vehicle in any direction), speedometers (which measure the instantaneous speed of a vehicle), airflow meters (which measure the flow of air around a vehicle), etc. Such physical movement sensors may incorporate the use of semiconductor strain gauges, electromechanical gauges that take readings from drivetrain rotations, barometric sensors, etc.

With respect to the feature of 2) sensing other cars and/or obstacles and/or physical structures around SDV 202, the positioning system 151 may use radar or other electromagnetic energy that is emitted from an electromagnetic radiation transmitter (e.g., transceiver 523 shown in FIG. 3), bounced off a physical structure (e.g., another car), and then received by an electromagnetic radiation receiver (e.g., transceiver 523). By measuring the time it takes to receive back the emitted electromagnetic radiation, and/or evaluating a Doppler shift (i.e., a change in frequency to the electromagnetic radiation that is caused by the relative movement of the SDV 202 to objects being interrogated by the electromagnetic radiation) in the received electromagnetic radiation from when it was transmitted, the presence and location of other physical objects can be ascertained by the SDV on-board computer 501.

With respect to the feature of 3) measuring the speed and direction of the SDV 202, this can be accomplished by taking readings from an on-board speedometer (not depicted) on the SDV 202 and/or detecting movements to the steering mechanism (also not depicted) on the SDV 202 and/or the positioning system 151 discussed above.

With respect to the feature of 4) providing any other inputs needed to safely control the movement of the SDV 202, such inputs include, but are not limited to, control signals to activate a horn, turning indicators, flashing emergency lights, etc. on the SDV 202.

In one or more embodiments of the present invention, SDV 202 includes roadway sensors 511 that are coupled to the SDV 202. Roadway sensors 511 may include sensors that are able to detect the amount of water, snow, ice on the roadway 208 (e.g., using cameras, heat sensors, moisture sensors, thermometers, etc.). Roadway sensors 511 also include sensors that are able to detect "rough" roadways (e.g., roadways having potholes, poorly maintained pavement, no paving, etc.) using cameras, vibration sensors, etc. Roadway sensors 511 may also include sensors that are also able to detect how dark the roadway 208 is using light sensors.

Similarly, a dedicated camera 521 can be trained on roadway 208, in order to provide photographic images capable of being evaluated, thereby recognizing erratic vehicular operations. For example, sequences of photographic images can show the velocity and any change in direction of EDV 204, thus providing the recognition of the erratic/unsafe driving pattern for EDV 204.

Similarly, a dedicated object motion detector 519 (e.g., a radar transceiver capable of detecting Doppler shifts indicative of the speed and direction of movement of EDV 204) can be trained on roadway 208, in order to detect the movement of other vehicles, such as SDVs 204/206 depicted in FIG. 2.

In one or more embodiments of the present invention, also within the SDV 202 are SDV equipment sensors 515. SDV equipment sensors 515 may include cameras aimed at tires on the SDV 202 to detect how much tread is left on the tire. SDV equipment sensors 515 may include electronic sensors that detect how much padding is left of brake calipers on disk brakes. SDV equipment sensors 515 may include drivetrain sensors that detect operating conditions within an engine (e.g., power, speed, revolutions per minute—RPMs of the engine, timing, cylinder compression, coolant levels, engine temperature, oil pressure, etc.), the transmission (e.g., transmission fluid level, conditions of the clutch, gears, etc.), etc. SDV equipment sensors 515 may include sensors that detect the condition of other components of the SDV 202, including lights (e.g., using circuitry that detects if a bulb is broken), wipers (e.g., using circuitry that detects a faulty wiper blade, wiper motor, etc.), etc.

In one or more embodiments of the present invention, also within SDV 202 is a communications transceiver 517, which is able to receive and transmit electronic communication signals (e.g., RF messages) from and to other communications transceivers found in other vehicles, servers, monitoring systems, etc.

In one or more embodiments of the present invention, also within SDV 202 is a telecommunication device 525 (e.g., a smart phone, a cell phone, a laptop computer, etc.), which may be connected (e.g., via a near field communication—NFC connection) to the SDV on-board computer 501. Thus, alerts regarding the repositioning of SDV 202 may be transmitted to a smart phone within the other SDVs 204/206 or an agency (e.g., a local fire fighting station).

Figure 6:
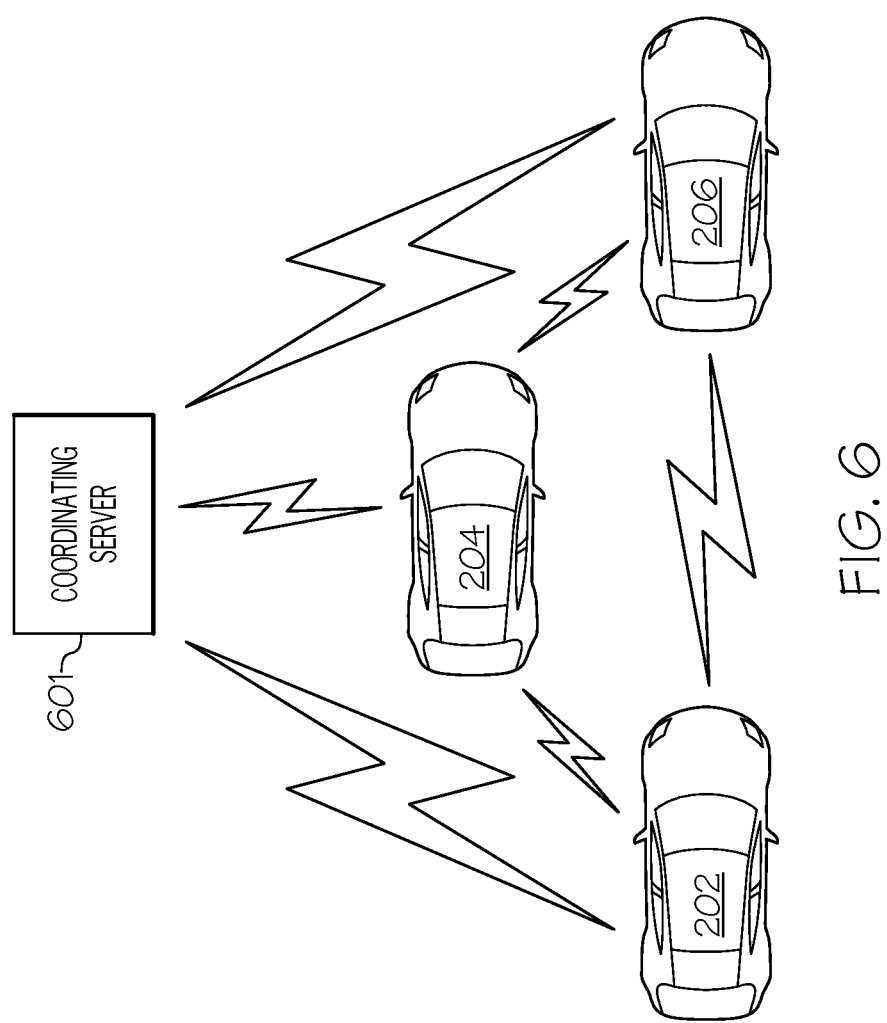
FIG. 6 depicts communication linkages among SDVs and a coordinating server.

While various SDVs may communicate directly with one another (e.g., as shown in FIG. 6 by SDV 202 directly communicating with SDV 204 and/or SDV 206), in one embodiment all communication between SDVs is via a coordinating server 601 (analogous to coordinating computer 201 shown in FIG. 2).

Figure 7:
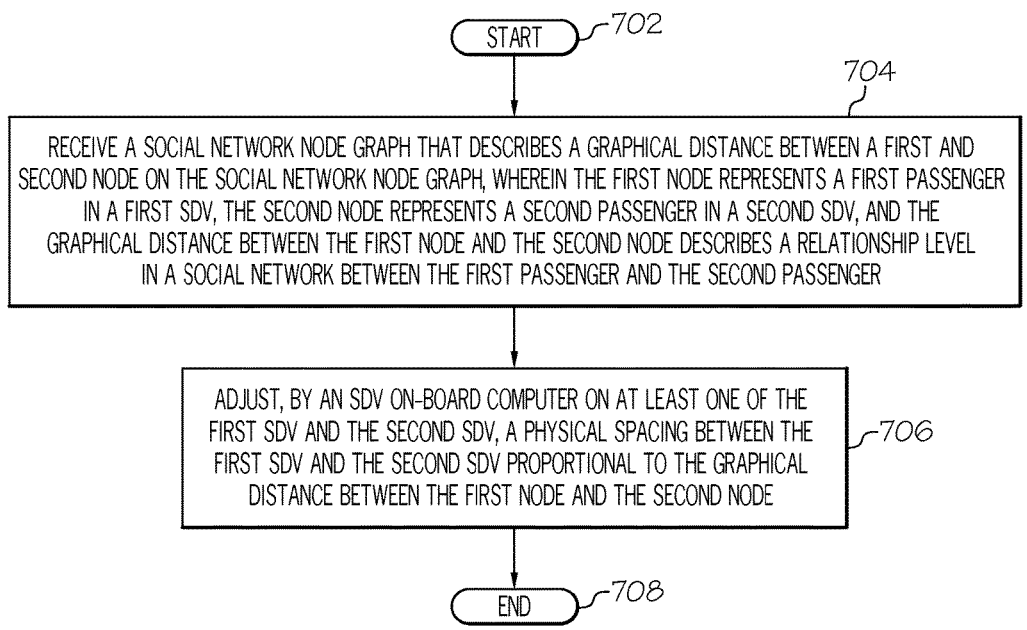
FIG. 7 is a high-level flow chart of one or more steps performed by one or more processors and/or other hardware devices to control a physical spacing between SDVs in accordance with one or more embodiments of the present invention.

With reference now to FIG. 7, a high-level flow chart of one or more steps performed by one or more processors and/or other hardware devices to control a physical spacing between self-driving vehicles (SDVs) in accordance with one or more embodiments of the present invention is presented. Note that various actions described for the present invention may be performed by the SDV on-board computer 501 shown in FIG. 5, the monitoring computer 601 shown in FIG. 6, and/or the cloud computing environment 50 shown in FIG. 9.

After initiator block 702, one or more processors (e.g., within SDV on-board computer 501 shown in FIG. 5) receive a social network node graph, as depicted in block 704. The social network node graph (e.g., social network node graph 400 shown in FIG. 4) describes a graphical distance between a first node on the social network node graph (e.g., social network node 402 shown in FIG. 4) and a second node on the social network node graph (e.g., social network node 406). As described herein and in an exemplary embodiment of the present invention, wherein the first node represents a first passenger in a first SDV (e.g., SDV 202 shown in FIG. 2); the second node represents a second passenger in a second SDV (e.g., SDV 206 shown in FIG. 2); and the graphical distance (i.e., number of "hops", number of dyadic ties) between the first node and the second node describes a relationship level in a social network between the first passenger and the second passenger.

As described in block 706, an SDV on-board computer (e.g., SDV on-board computer 501 shown in FIG. 5) on at least one of the first SDV and the second SDV adjusts a physical spacing between the first SDV and the second SDV proportional to the graphical distance between the first node and the second node. That is, the greater the graphical distance between the two nodes on the social network node graph, the greater the physical spacing distance between the two SDVs.

The flow-chart ends at terminator block 708.

In an embodiment of the present invention, the SDV on-board computer on the first SDV and/or the second SDV alter a route of travel of the first and/or second SDVs based on the relationship level between the first passenger and the second passenger. For example, assume that the passenger of SDV 202 and the passenger of SDV 206 are both fans of public sculptures, as indicated by these two passengers both being members of a social network group devoted to public sculptures. Assume further that SDV 202 and SDV 206 are both traveling on an interstate highway en route to a museum. However, between the current location of SDVs 202/206 and the museum is a popular group of public sculptures, which are located on a side road. Leaving the interstate highway and taking this side road may add five minutes to the trip to the museum, but it would allow the passengers of the SDVs 202/206 to view the public sculptures, which (due to their membership in the social networking group dedicated to public sculptures) is likely to be of great interest to them. Thus, the system will 1) suggest the alternate route to the passengers of the SDVs 202/206 (e.g., via their smart phones) and 2) upon receipt of a signal/message indicating an interest in seeing the public sculptures, will automatically alter the travel route to take the "scenic" side road.

In an embodiment of the present invention, the social network node graph (e.g., social network node graph 400 shown in FIG. 4) further describes a graphical distance between a third node on the social network node graph (e.g., social network node 408) and the second node on the social network node graph (social network node 406). That is, there are two social network nodes (e.g., social network nodes 402/408 shown in FIG. 4) for two different passengers in SDV 202, and one social network node 406 for the passenger in SDV 206. Thus, the first node (e.g., social network node 402 represents the first passenger in SDV 402); the third node (e.g., social network node 408) represents the third passenger in the first SDV 202; and the second node (e.g., social network node 406) represents the passenger in the second SDV 206.

As shown in FIG. 4, the graphical distance between the third node (e.g., social network node 408) and the second node (e.g., social network node 406) describes a relationship level in the social network between the third passenger and the second passenger. For example, if the second passenger in SDV 206 and the third passenger in SDV 202 are both in a same social circle in the social network (as indicated by dyadic tie 414 in FIG. 4), then the first passenger in the SDV 202 and the third passenger in the SDV 202 both have a first order (single "hop") relationship with the second passenger of SDV 206 (as indicated by the single dyadic ties 410/414). However, if the third passenger of SDV 202 is only associated with the second passenger of SDV 206 based on the relationship between the first passenger of SDV 202 and the third passenger of SDV 202 (as indicated by dyadic tie 416), then the relationship between the third passenger of SDV 202 and the passenger of SDV 206 is weaker (i.e., is a two-hop relationship) than the relationship between the first passenger of SDV 202 and the second passenger of SDV 206 (which is a one-hop relationship).

Thus, in one or more embodiments in the scenario just described, one or more processors weight the first node (e.g., social network node 402 in FIG. 4) and the third node (e.g., social network node 408) based on the relationship level in the social network between the first passenger and the second passenger versus the relationship level in the social network between the third passenger and the second passenger. An SDV on-board computer on at least one of the first SDV and the second SDV then adjust a physical spacing between the first SDV and the second SDV based on the weighted first and third nodes. For example, if social network node 408 is associated with social network node 406 via a combination of dyadic tie 416 and dyadic tie 410 depicted in FIG. 4, then social network node 408 will have little if any impact on the positioning of SDV 206 relative to SDV 202, since it is the one-hop relationship between social network node 402 and social network node 406 that controls this SDV physical spacing.

However, assume now that social network node 408 has a single hop relationship with social network node 404, as indicated by dyadic tie 418. In this case, there will be a tension between which SDV (SDV 206 or SDV 204) is moved closer to SDV 202, since the two passengers in SDV 202 have one hop relationships with passengers in the two other SDVs (SDV 204 and SDV 206).

In one or more embodiments of the present invention, a weighted voting system is used to weight the various variables used in making the decision to establish spacing distances between SDVs and/or to adjust their routes, particularly in the scenario just described in which two social network nodes have a same logical/graphical relation to another social network node. Such inputs may include: votes by other nearby cars (i.e., occupants of other SDVs that vote on which passenger in SDV 202 shown determines the positioning of SDVs 204/206), a history of the efficiency of positioning certain SDVs in proximity of another SDV, etc. Such weighted voting approaches may be characterized primarily by three aspects—the inputs, the weights, and the quota. The inputs are (I1, I2, . . . , IN). N denotes the total number of inputs. An input's weight (w) is the number of "votes" associated with the input. The quota (q) is the minimum number of votes required to "pass a motion," which in this case refers primarily to a decision made regarding into the distance placed between SDVs on a roadway.

In an embodiment of the present invention, roadway sensors are used to adjust the physical spacing between the first SDV and the second SDV. For example, if the roadway 208 is wet, then physical spacing between SDV 202 and SDV 206 will be expanded from the physical spacing that would be allocated if the roadway 208 were dry.

In an embodiment of the present invention, roadway sensors are used to determine which operational mode to use on one or more of the SDVs discussed herein. For example, assume that a roadway sensor (e.g., one or more of roadway sensor(s) 210 shown in FIG. 2 and/or one or more of the roadway sensors 511 shown in FIG. 5) detect a current roadway condition of a roadway upon which the first SDV is traveling (e.g., wet, icy, dark, etc.). Based on the sensor readings from such roadway sensors, an operational mode device 507 in FIG. 5 on the first SDV adjusts an operational mode (e.g., autonomous or manual) of the first SDV.

Thus, assume again that the SDV 202 shown in FIG. 2 is traveling on a roadway (e.g., roadway 208 shown in FIG. 2). One or more processors (e.g., within SDV on-board computer 501) receive sensor readings from multiple sensors (e.g., roadway sensor(s) 210 shown in FIG. 2). In one embodiment, each of the multiple sensors detects a different type of current condition of the roadway. Based on the sensor readings (and thus the current roadway condition of the roadway), the SDV on-board computer (e.g., SDV on-board computer 501 shown in FIG. 5) further adjusts the physical spacing between SDV 202 and other SDVs on the roadway. For example, if the roadway conditions are clear and dry, then the SDV on-board computer may cause the SDV to minimize the spacing. However, if the roadway conditions are dark and/or icy, then the SDV on-board computer may increase the amount of physical space between SDV 202 and other SDVs on the roadway.

In an embodiment of the present invention, the processor(s) weight each of the sensor readings for different current conditions of the roadway (e.g., snow on the roadway is weighted higher than rain on the roadway, but less than ice on the roadway). The processor(s) sum the weighted sensor readings for the different current conditions of the roadway, and determine whether the summed weighted sensor readings exceed a predefined level (e.g., some particular numerical value). In response to determining that the summed weighted sensor readings exceed a predefined level, the on-board SDV control processor adjusts the physical space between the SDV and other SDV(s) accordingly.

In one embodiment of the present invention, a decision to place the SDV (e.g., one or more of the SDVs 202/204/206 described herein) into autonomous mode or manual mode is based on the driver of the SDV being part of a cohort of drivers that share certain traits. That is, in one embodiment of the present invention assume that the SDV 202 shown in FIG. 2 is traveling on roadway 210. One or more processors (e.g., within coordinating computer 601 shown in FIG. 6) retrieve driver profile information about the human driver of the SDV, and then assign the human driver of the SDV to a cohort of drivers traveling on the roadway in other vehicles (where the human driver of the SDV shares more than a predetermined quantity of traits with members of the cohort of drivers). The processor(s) retrieve traffic pattern data for the other vehicles while traveling on the roadway, and examine that traffic pattern data to determine a first traffic flow of the multiple vehicles (e.g., while operating in the autonomous mode described above) and a second traffic flow of the multiple SDVs (while operating in the manual mode described above). In response to determining that the first traffic flow has a lower accident rate than the second traffic flow, and assuming the SDV 202 is currently being operated in manual mode, the processor(s) change the operational mode of the SDV from manual mode to autonomous mode, since the data shows that autonomous mode is safer than manual mode in the present conditions.

In one embodiment of the present invention, the decision to place the SDV in manual or one of the autonomous modes described herein is further dependent on the current mechanical condition of the SDV (e.g., the condition of the tires, the condition of the brakes, the condition of the headlights, the condition of the windshield wipers, the condition of the engine, the condition of the transmission, the condition of the cooling system, etc.). Thus, one or more processor(s) (e.g., within the SDV on-board computer 501 shown in FIG. 5) receive operational readings from one or more operational sensors (e.g., SDV equipment sensors 515 shown in FIG. 5) on the SDV, which detect a current state of mechanical equipment on the SDV. Based on the received operational readings, the processor(s) detect a mechanical fault (e.g., faulty brakes, bald tires, etc.) with the mechanical equipment on the SDV. In response to detecting the mechanical fault with the mechanical equipment on the SDV, the operational mode device adjusts the operational mode of the SDV from manual mode to autonomous mode.

In one or more embodiments of the present invention, the operational mode device 507 along with the SDV on-board computer 501 shown in FIG. 5 provides a process for selectively switching between various types of autonomous modes and/or a manual mode. However, if such switching back and forth occurs too frequently, safety issues may arise. For example, if the operational mode device in FIG. 5 switches control of the SDV 202 from the manual mode to the autonomous mode, and then switches control of the SDV 202 back to the manual mode a few seconds later, the driver and/or SDV will likely become confused and/or ineffective.

Therefore, in one embodiment of the present invention, a predefined time limit and/or physical distance is set between switching back and forth between operational modes. For example, based on historical data that describes how long the current driver (and/or drivers from a cohort of drivers that have similar traits/characteristics as the current driver) needs to recover from relinquishing control of the SDV to the autonomous controller, the predefined time limit may be one minute. Similarly, based on historical data that describes how far the current driver must travel in order to recover from relinquishing control of the SDV to the autonomous controller, the predefined physical distance may be one mile. Therefore, if the system has switched from the manual mode to the autonomous mode, then one minute must pass and/or one mile must be traversed by the SDV before control can be returned back to the driver (e.g., manual mode is re-activated).

In one or more embodiments, the present invention is implemented in a cloud environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
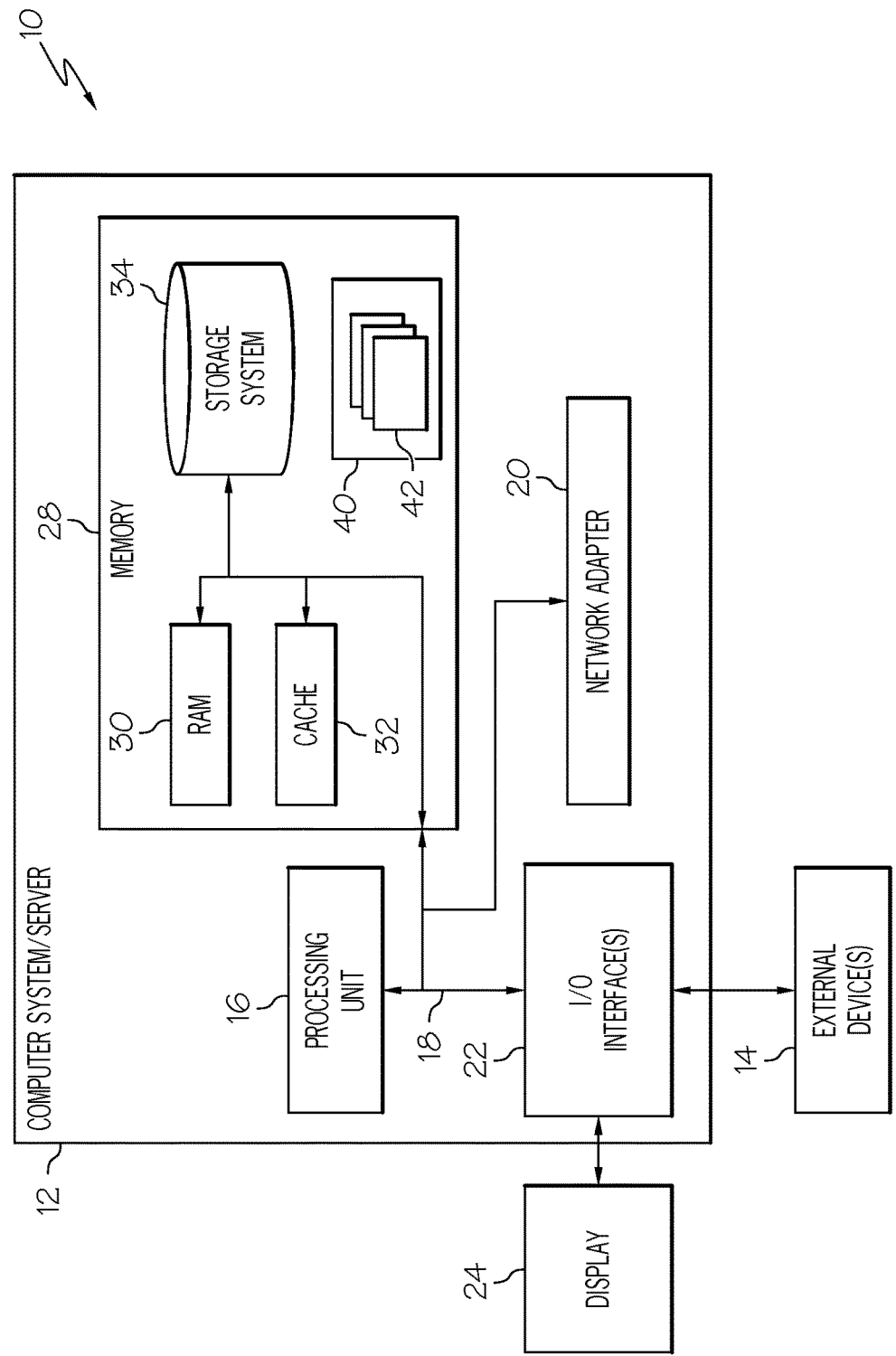
FIG. 8 depicts a cloud computing node according to an embodiment of the present disclosure.

Referring now to FIG. 8, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 9:
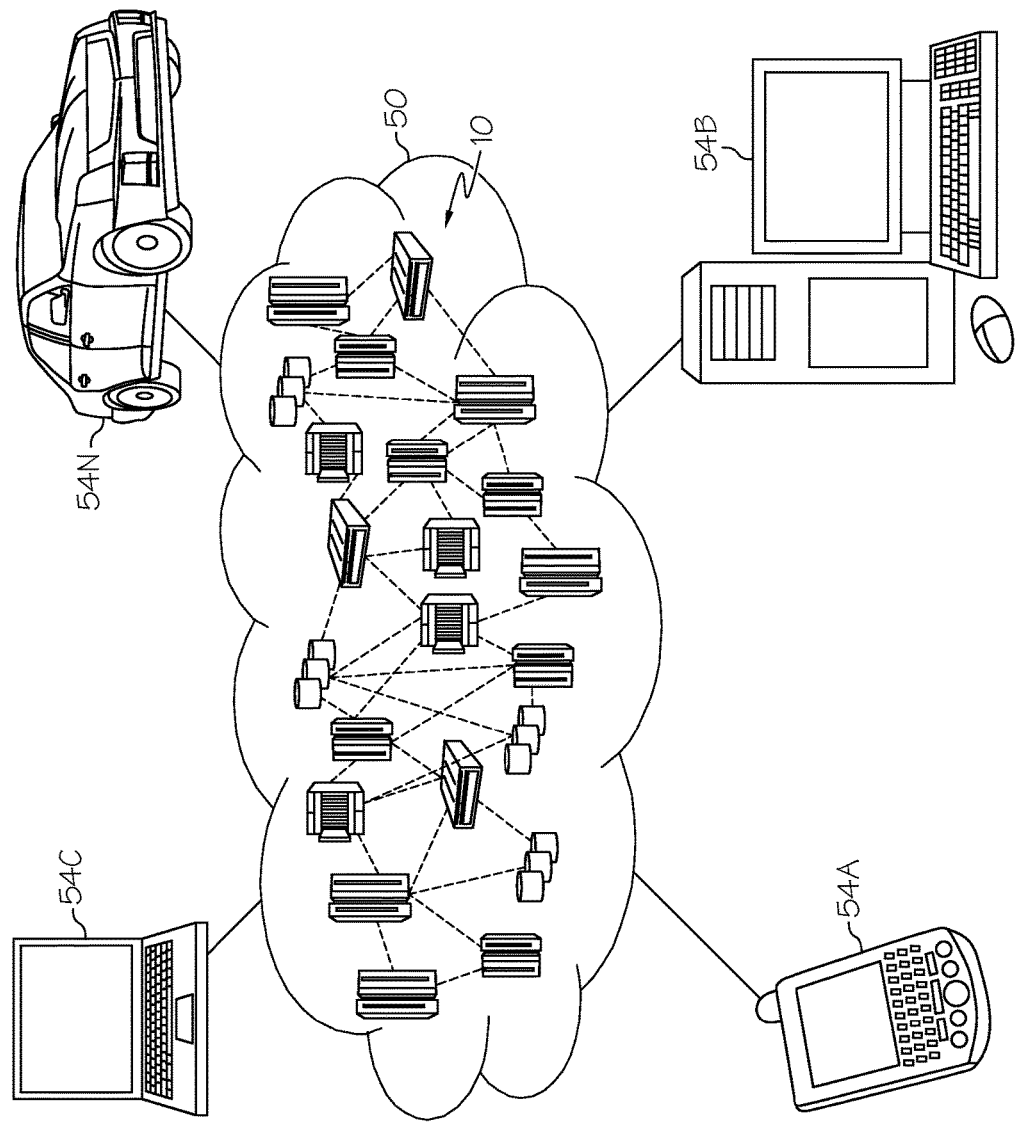
FIG. 9 depicts a cloud computing environment according to an embodiment of the present disclosure.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
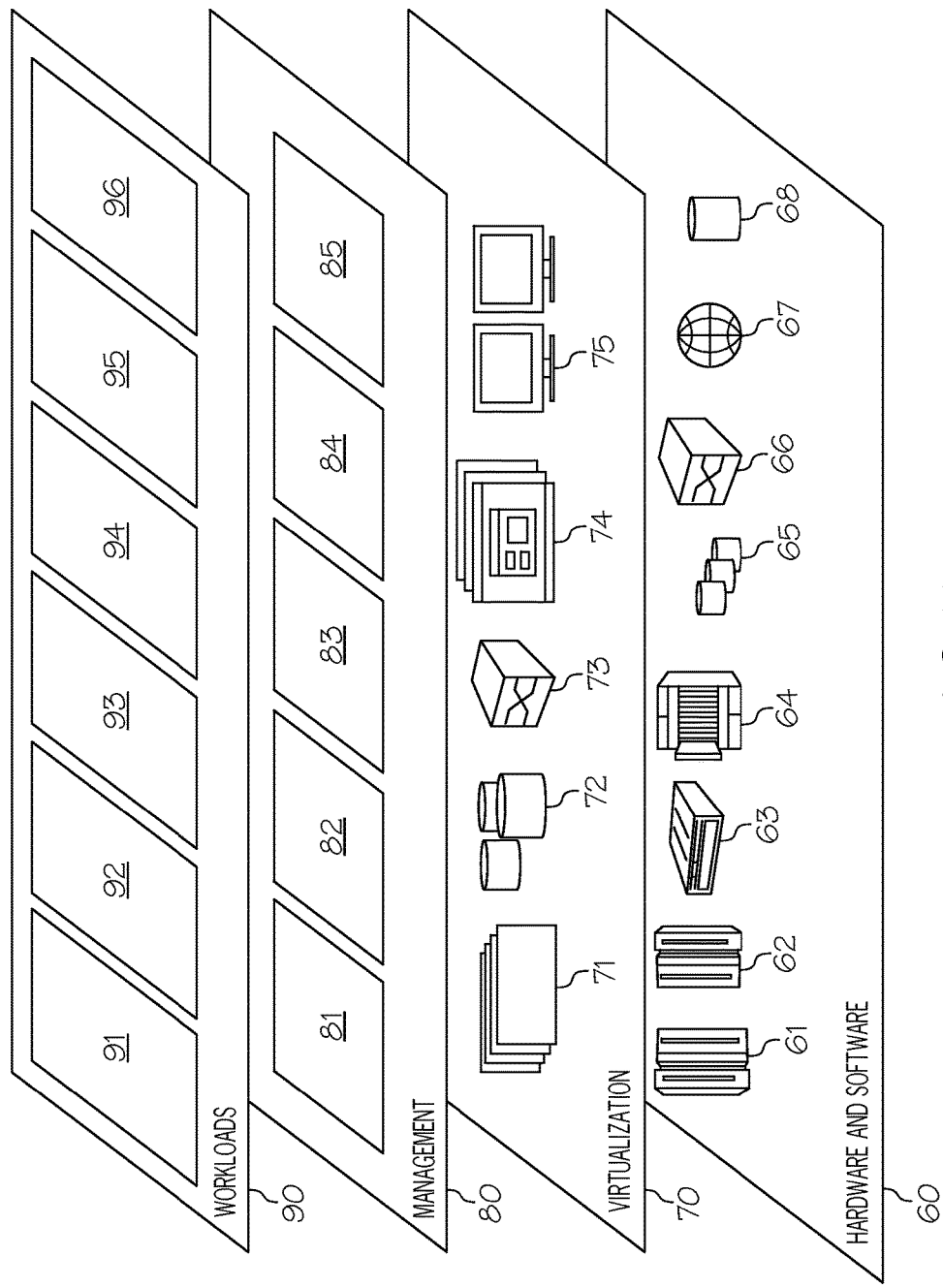
FIG. 10 depicts abstraction model layers according to an embodiment of the present disclosure.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and self-driving vehicle control processing 96 (for selectively setting/controlling physical spacing between SDVs as described herein).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method for controlling a physical spacing between self-driving vehicles (SDVs), the method comprising:
    receiving, by one or more processors, a social network node graph, wherein the social network node graph describes a graphical distance between a first node on the social network node graph and a second node on the social network node graph, wherein the first node represents a first passenger in a first SDV, wherein the second node represents a second passenger in a second SDV, and wherein the graphical distance between the first node and the second node describes a relationship level in a social network between the first passenger and the second passenger; and
    adjusting, by an SDV on-board computer on at least one of the first SDV and the second SDV, a physical spacing between the first SDV and the second SDV proportional to the graphical distance between the first node and the second node.

2. The method of claim 1, further comprising:
    altering, by the SDV on-board computer on said at least one of the first SDV and the second SDV, a route of travel based on the relationship level between the first passenger and the second passenger.

3. The method of claim 1, wherein the social network node graph further describes a graphical distance between a third node on the social network node graph and the second node on the social network node graph, wherein the third node represents a third passenger in the first SDV, wherein the graphical distance between the third node and the second node describes a relationship level in the social network between the third passenger and the second passenger, and wherein the method further comprises:
    weighting, by one or more processors, the first node and the third node based on the relationship level in the social network between the first passenger and the second passenger versus the relationship level in the social network between the third passenger and the second passenger; and
    adjusting, by an SDV on-board computer on at least one of the first SDV and the second SDV, a physical spacing between the first SDV and the second SDV based on the weighted first and third nodes.

4. The method of claim 1, further comprising:
    detecting, based on sensor readings from a roadway sensor, a current roadway condition of a roadway upon which the first SDV and the second SDV are traveling; and
    further adjusting, by the SDV on-board computer on the first SDV, the physical spacing between the first SDV and the second SDV based on the current roadway condition of the roadway upon which the first SDV and the second SDV are traveling.

5. The method of claim 1, wherein the first SDV is traveling on a roadway in manual mode and the second SDV is traveling on the roadway in autonomous mode, and wherein the method further comprises:

retrieving, by one or more processors, driver profile information about a human driver of the first SDV;

assigning, by one or more processors, the human driver of the first SDV to a cohort of drivers who have traveled on the roadway in other SDVs, wherein the human driver of the first SDV shares more than a predetermined quantity of traits with members of the cohort of drivers who have traveled on the roadway in the other SDVs;

retrieving, by one or more processors, traffic pattern data for the other SDVs as they traveled on the roadway;

examining, by one or more processors, the traffic pattern data to determine a first traffic flow of the other SDVs while operating in autonomous mode on the roadway;

examining, by one or more processors, the traffic pattern data to determine a second traffic flow of the other SDVs while operating in manual mode on the roadway; and in response to determining that the first traffic flow has a lower accident rate than the second traffic flow, changing, by the operational mode device, the operational mode of the first SDV from manual mode to autonomous mode.

6. The method of claim 1, wherein the first SDV and the second SDV are traveling on the roadway in autonomous mode, and wherein the method further comprises:

receiving, by one or more processors, sensor readings from multiple sensors, wherein each of the multiple sensors detects a different type of current condition of the roadway;

weighting, by one or more processors, each of the sensor readings for different current conditions of the roadway;

summing, by one or more processors, weighted sensor readings for the different current conditions of the roadway;

determining, by one or more processors, whether the summed weighted sensor readings exceed a predefined level; and in response to determining that the summed weighted sensor readings exceed the predefined level, further adjusting, by an SDV on-board computer on at least one of the first SDV and the second SDV, the physical spacing between the first SDV and the second SDV.

7. The method of claim 1, wherein the first SDV and the second SDV are traveling on the roadway in autonomous mode, and wherein the method further comprises:

receiving, by one or more processors, operational readings from one or more SDV operational sensors on the first SDV, wherein the SDV operational sensors detect a current state of mechanical equipment on the first SDV;

detecting, by the one or more processors and based on received operational readings, a mechanical fault with the mechanical equipment on the first SDV; and in response to detecting the mechanical fault with the mechanical equipment on the first SDV, further adjusting, by the SDV on-board computer on said at least one of the first SDV and the second SDV, the physical spacing between the first SDV and the second SDV.

8. A computer program product for controlling a physical spacing between self-driving vehicles (SDVs), the computer program product comprising a non-transitory computer readable storage medium having program code embodied therewith, the program code readable and executable by a processor to perform a method comprising:

receiving a social network node graph, wherein the social network node graph describes a graphical distance between a first node on the social network node graph and a second node on the social network node graph, wherein the first node represents a first passenger in a first SDV, wherein the second node represents a second passenger in a second SDV, and wherein the graphical distance between the first node and the second node describes a relationship level in a social network between the first passenger and the second passenger; and adjusting, via an SDV on-board computer on at least one of the first SDV and the second SDV, a physical spacing between the first SDV and the second SDV proportional to the graphical distance between the first node and the second node.

9. The computer program product of claim 8, wherein the method further comprises:

altering, via the SDV on-board computer on said at least one of the first SDV and the second SDV, a route of travel based on the relationship level between the first passenger and the second passenger.

10. The computer program product of claim 8, wherein the social network node graph further describes a graphical distance between a third node on the social network node graph and the second node on the social network node graph, wherein the third node represents a third passenger in the first SDV, wherein the graphical distance between the third node and the second node describes a relationship level in the social network between the third passenger and the second passenger, and wherein the method further comprises:

weighting the first node and the third node based on the relationship level in the social network between the first passenger and the second passenger versus the relationship level in the social network between the third passenger and the second passenger; and adjusting, via an SDV on-board computer on at least one of the first SDV and the second SDV, a physical spacing between the first SDV and the second SDV based on the weighted first and third nodes.

11. The computer program product of claim 8, wherein the method further comprises:

detecting, based on sensor readings from a roadway sensor, a current roadway condition of a roadway upon which the first SDV and the second SDV are traveling; and further adjusting the physical spacing between the first SDV and the second SDV based on the current roadway condition of the roadway upon which the first SDV and the second SDV are traveling.

12. The computer program product of claim 8, wherein the first SDV is traveling on a roadway in manual mode and the second SDV is traveling on the roadway in autonomous mode, and wherein the method further comprises:

retrieving driver profile information about a human driver of the first SDV;

assigning the human driver of the first SDV to a cohort of drivers who have traveled on the roadway in other SDVs, wherein the human driver of the first SDV shares more than a predetermined quantity of traits with members of the cohort of drivers who have traveled on the roadway in the other SDVs;

retrieving traffic pattern data for the other SDVs as they traveled on the roadway;

examining the traffic pattern data to determine a first traffic flow of the other SDVs while operating in autonomous mode on the roadway;

examining the traffic pattern data to determine a second traffic flow of the other SDVs while operating in manual mode on the roadway; and in response to determining that the first traffic flow has a lower accident rate than the second traffic flow, changing, via an operational mode device on the first SDV, an operational mode of the first SDV from manual mode to autonomous mode.

13. The computer program product of claim 8, wherein the first SDV and the second SDV are traveling on the roadway in autonomous mode, and wherein the method further comprises:

receiving sensor readings from multiple sensors, wherein each of the multiple sensors detects a different type of current condition of the roadway;

weighting each of the sensor readings for different current conditions of the roadway;

summing weighted sensor readings for the different current conditions of the roadway;

determining whether the summed weighted sensor readings exceed a predefined level; and in response to determining that the summed weighted sensor readings exceed the predefined level, further adjusting, via an SDV on-board computer on at least one of the first SDV and the second SDV, the physical spacing between the first SDV and the second SDV.

14. The computer program product of claim 8, wherein the first SDV and the second SDV are traveling on the roadway in autonomous mode, and wherein the method further comprises:

receiving operational readings from one or more SDV operational sensors on the first SDV, wherein the SDV operational sensors detect a current state of mechanical equipment on the first SDV;

detecting, based on received operational readings, a mechanical fault with the mechanical equipment on the first SDV; and in response to detecting the mechanical fault with the mechanical equipment on the first SDV, further adjusting, via the SDV on-board computer on said at least one of the first SDV and the second SDV, the physical spacing between the first SDV and the second SDV.

15. A self-driving vehicle comprising:

a processor, a computer readable memory, and a non-transitory computer readable storage medium;

first program instructions to receive a social network node graph, wherein the social network node graph describes a graphical distance between a first node on the social network node graph and a second node on the social network node graph, wherein the self-driving vehicle is a first self-driving vehicle (SDV), wherein the first node represents a first passenger in a first SDV, wherein the second node represents a second passenger in a second SDV, and wherein the graphical distance between the first node and the second node describes a relationship level in a social network between the first passenger and the second passenger; and second program instructions to direct an SDV on-board computer on the first SDV to adjust a physical spacing between the first SDV and the second SDV proportional to the graphical distance between the first node and the second node; and wherein the first and second program instructions are stored on the non-transitory computer readable storage medium for execution by one or more processors via the computer readable memory.

16. The self-driving vehicle of claim 15, further comprising:

third program instructions to alter a route of travel based on the relationship level between the first passenger and the second passenger; and wherein the third program instructions are stored on the non-transitory computer readable storage medium for execution by one or more processors via the computer readable memory.

17. The self-driving vehicle of claim 15, wherein the social network node graph further describes a graphical distance between a third node on the social network node graph and the second node on the social network node graph, wherein the third node represents a third passenger in the first SDV, wherein the graphical distance between the third node and the second node describes a relationship level in the social network between the third passenger and the second passenger, and wherein the self-driving vehicle further comprises:

third program instructions to weight the first node and the third node based on the relationship level in the social network between the first passenger and the second passenger versus the relationship level in the social network between the third passenger and the second passenger; and fourth program instructions to adjust a physical spacing between the first SDV and the second SDV based on the weighted first and third nodes; and wherein the third and fourth program instructions are stored on the non-transitory computer readable storage medium for execution by one or more processors via the computer readable memory.

18. The self-driving vehicle of claim 15, further comprising:

a roadway sensor for detecting a current roadway condition of a roadway upon which the self-driving vehicle is traveling; and an operational mode device for adjusting an operational mode of the self-driving vehicle based on the current roadway condition detected by the roadway sensor.

19. The self-driving vehicle of claim 15, wherein the self-driving vehicle is a first SDV that is traveling on a roadway in manual mode and while a second SDV is traveling on the roadway in autonomous mode, and wherein the self-driving vehicle further comprises:

third program instructions to retrieve driver profile information about a human driver of the first SDV;

fourth program instructions to assign the human driver of the first SDV to a cohort of drivers who have traveled on the roadway in other SDVs, wherein the human driver of the first SDV shares more than a predetermined quantity of traits with members of the cohort of drivers who have traveled on the roadway in the other SDVs;

fifth program instructions to retrieve traffic pattern data for the other SDVs as they traveled on the roadway;

sixth program instructions to examine the traffic pattern data to determine a first traffic flow of the other SDVs while operating in autonomous mode on the roadway;

seventh program instructions to examine the traffic pattern data to determine a second traffic flow of the other SDVs while operating in manual mode on the roadway; and eighth program instructions to, in response to determining that the first traffic flow has a lower accident rate than the second traffic flow, change, via an operational mode device on the first SDV, the operational mode of the first SDV from manual mode to autonomous mode; and wherein the third, fourth, fifth, sixth, seventh, and eighth program instructions are stored on the non-transitory computer readable storage medium for execution by one or more processors via the computer readable memory.

20. The self-driving vehicle of claim 15, wherein the self driving vehicle is traveling on a roadway while in autonomous mode, and wherein the self-driving vehicle further comprises:

one or more SDV operational sensors for generating operational readings based on a current state of mechanical equipment on the self-driving vehicle, wherein the one or more SDV operational sensors detect a mechanical fault with the mechanical equipment on the self-driving vehicle, and wherein the SDV on-board computer on the first SDV, in response to detecting the mechanical fault with the mechanical equipment on the first SDV, further adjusts the physical spacing between the first SDV and the second SDV.

* * * * *